Patented Oct. 14, 1952

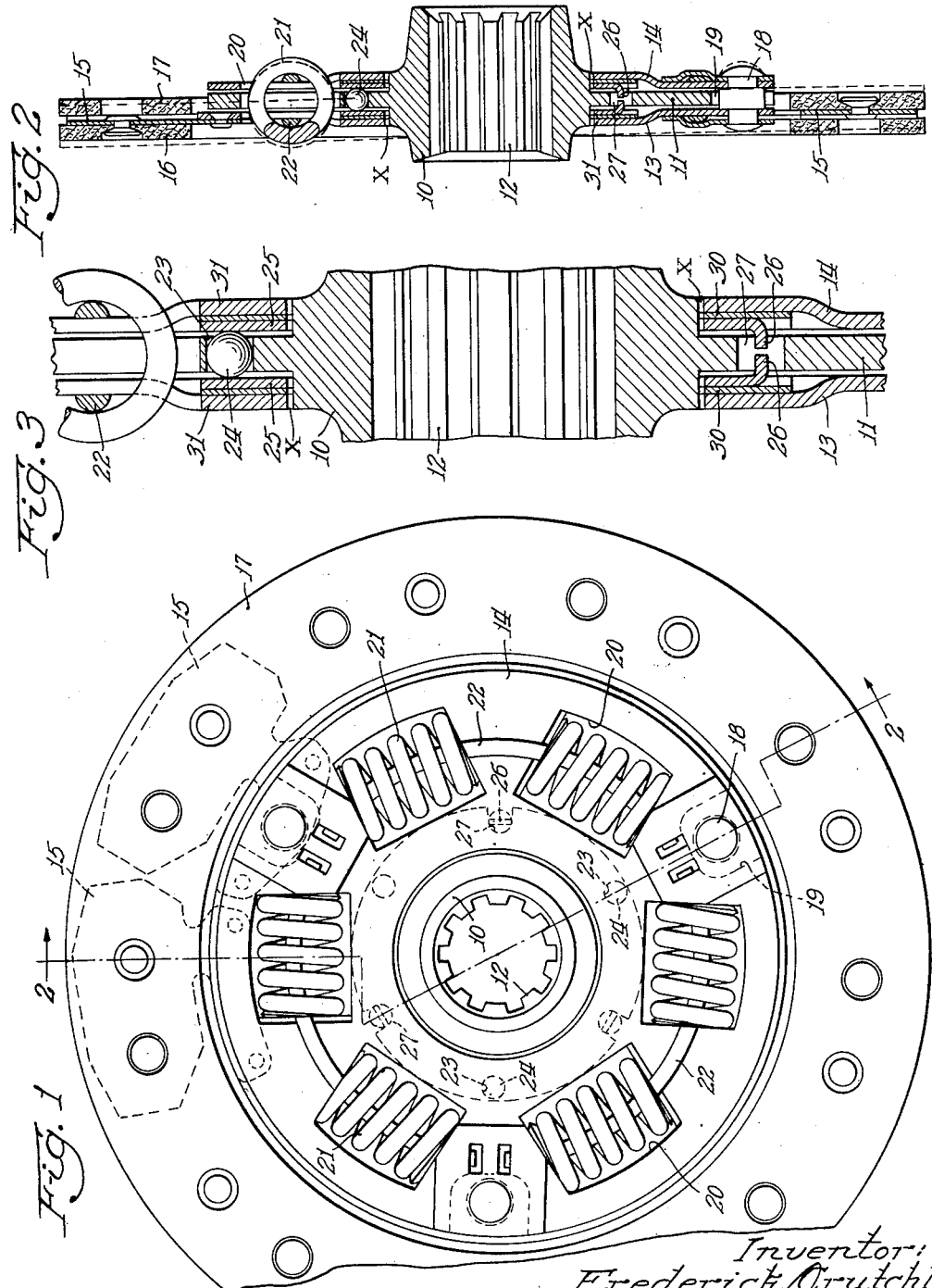

2,613,515

UNITED STATES PATENT OFFICE 2,613,515

DRIVEN PLATE FOR FRICTION CLUTCHES

Frederick Crutchley, Leamington Spa, England, assignor to Borg-Warner Corporation, Chicago, Ill.

Application April 19, 1946, Serial No. 663,329
In Great Britain April 20, 1945

4 Claims. (Cl. 64—27)

This invention relates to driven plates for friction clutches, and particularly to driven plates of the kind comprising a hub member, upon which is mounted a radially extending annular member adapted for limited movement relative to said hub member, the annular member being arranged to be frictionally gripped at its outer part between a driving member and a pressure plate rotatable therewith, these parts forming the driving portion of the clutch.

According to the invention, in a clutch driven plate of the kind referred to, having the annular member movable relative to the hub member in the plane of the annular member and adapted for limited tilting movement relative to the hub member, an intermediate member is restrained against one of said movements with respect to one member and against the other of said movements with respect to the other member, so that each of said movements takes place between the intermediate member and only one of said first mentioned members.

According to one aspect of the invention a clutch driven plate of the kind referred to comprises between the hub member and the annular member, an intermediate member arranged for tilting movement relative to the hub member and for radial and circumferential sliding movement relative to the annular member, and resilient means acting between the annular member and the hub member to urge them towards a predetermined relative position.

The annular member may comprise two interconnected discs disposed one on each side of a flange of the hub member, and the intermediate member may comprise a pair of rings located one between each of the said discs and the flange, the said rings being restrained against radial and circumferential movement relative to the hub flange, and having frictional engagement with the discs.

The rings may be spaced apart to a distance greater than the thickness of the hub flange by spacing members slidable in a circumferential series of apertures extending through the hub flange, and the spacing members may be balls having a diameter greater than the thickness of the flange.

The invention is hereinafter described with reference to the accompanying drawings, in which:

Figure 1 is a front elevation of one form of clutch driven plate according to the invention;

Figure 2 is a section on the line 2—2 of Figure 1; and

Figure 3 is a section, similar to the central part of Figure 2, but drawn to an enlarged scale.

Referring to the drawings, the clutch plate comprises a hub 10 formed with a radial flange 11, and splined internally at 12 so that it may be mounted for sliding movement but not for rotation upon a driven shaft, a pair of metal discs 13 and 14 disposed one on each side of the hub flange 11, and radially-projecting members 15 riveted to the disc 13 to support friction facings 16 and 17. The members 15 are resilient, and are bent along radial lines to space the facings 16 and 17 apart, the said members being flattened when the plate is gripped between the driving member and the pressure plate to provide a gradual take-up of the drive.

The two discs 13 and 14 are secured together, by shouldered rivets 18 lying in notches 19 in the edge of the hub flange 11, so that they limit the relative angular movement of the hub and discs. A circumferential series of substantially rectangular openings 20 are cut in the hub flange and discs, and coil springs 21 are mounted in the openings with their axes tangential to a circle about the clutch centre. The springs 21 are retained in position by wires 22 on each side of the assembly, the wires 22 passing through the springs and being clamped in position at their ends, as described in British patent specification No. 369,810. The springs 21 are compressed by any relative angular movement of the hub and discs, between one end of the openings in the hub flange and the other end of the openings in the discs, and so serve to absorb vibrations and irregularities of torque passing through the clutch.

The hub flange 11 is formed, near its root, with six circular holes equally angularly spaced and extending through it in an axial direction, and in alternate holes 23 are located three balls 24 which are a sliding fit therein, the diameter of the balls being greater than the thickness of the flange 11. A pair of rings 25—25 of thin sheet steel surround the hub one on each side of the flange 11, extending radially outwardly to just beyond the balls 24, and these rings 25—25 are restrained against radial and circumferential movement on the hub by inturned nibs 26 entering, and fitting closely in, the intermediate holes 27 in the flange 11. Against the outer face of each ring 25 is a ring 30 of shim steel, and the appropriate disc 13 or 14 of the annular member rests against the shim steel ring 30. The radially inner portion 31 of each disc 13 or 14 is displaced outwardly from the general plane of the disc to provide a space in which the rings 25—25 and the shim steel rings 30—30 are accommodated, and the length of the shouldered rivets 18 securing the discs 13 and 14 together is such that the discs are clamped tightly against the shim steel rings 30—30, the latter in turn being held tightly against rings 25—25, so that there is appreciable frictional resistance to relative sliding movement of the annular member (the discs 13—14) and the intermediate member (the rings 25—25). The central apertures in the discs 13—14 and in the shim steel rings 30—30 are large enough to allow these parts to move to an eccentric position on the hub 10. It will be seen that the discs 13 and 14 are spaced apart by the rivets 18 to a distance greater than the thickness of the hub flange 11 and there is a gap $x$ between the hub surface and the inner edges of the discs and rings. The balls 24, which are free to move in the direction of the thickness of the flange, have diameters greater than the thickness of the hub flange 11, so that the assembled structure (including the discs 13, 14, the rings 25, 25, the shim steel rings 30, 30 and the friction facings 16 and 17), is only loosely mounted on the hub, and can tilt as a whole with relation to the hub to a certain extent. This is shown in dotted lines on Fig. 2. The maximum degree of tilt on the balls is limited by the total clearance between the peripheral edge of the hub flange 11 and the discs 13 and 14 since, in the extreme tilted position, one disc 13 or 14 may engage the edge of the hub flange at one point, and the other of said discs may engage the edge of the hub flange at a diametrically opposite point.

As has already been explained, the coil springs 21 located in the openings 20 in the hub flange 11 and discs 13—14 tend to resist relative rotational movement of these parts, and it will be appreciated that they also tend to resist relative radial movement, since one or more of them are always compressed by such movement. The frictional drag between the discs 13 and 14 of the annular member and the rings 25—25 comprising the intermediate member tends to damp these movements.

While the invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

The clutch driven plate according to the invention provides the well-known damping of the angular vibrations, and also permits slight radial displacement of the annular member with respect to the hub member, and slight relative tilting of these parts.

What I claim is:

1. A clutch driven plate comprising a hub member having an apertured radial flange; a radially extending annular member; an intermediate member between the said hub member and said annular member, said annular member comprising two interconnected discs disposed one on each side of said hub flange, and said intermediate member comprising a pair of rings located one between each of the said discs and hub flange, the said rings being restrained against radial and circumferential movement relative to said hub flange and having frictional engagement with said discs; and balls slidable in the apertures in said hub flange having diameters greater than the thickness of said hub flange, said balls being effective to space said rings apart a distance greater than the thickness of said hub flange.

2. A clutch driven plate comprising a hub member having a radial flange with a plurality of seats; a radially extending annular member; an intermediate member between the said hub member and said annular member, said annular member comprising two interconnected discs disposed one on each side of said hub flange, and said intermediate member comprising a pair of rings located one between each of the said discs and hub flange and having frictional engagement with said discs; and inturned projections on said rings engaged with said seats whereby said rings are restrained against radial and circumferential movement relative to said hub flange.

3. A clutch driven plate as defined in claim 2 wherein the hub flange has apertures; and spherical members slidably mounted in said apertures and having diameters greater than the thickness of said flange, said spherical members extending beyond the side surfaces of said flange and being engaged with the rings to space said rings axially from said flange and loosely mount the plate structure on the hub for limited tilting movement with respect to said hub.

4. A clutch driven plate comprising a flanged hub unit having pockets; rings on said hub next said flange; balls mounted in certain of the said pockets and spacing said rings from said flange for tilting movement with respect to said hub unit; annular members alongside said rings and tiltable with said rings on said balls; means connecting said annular members and hub unit for rotation in unison and for effecting limited rotation of said annular members relative to said hub units; and inturned tangs on said rings entered in other pockets of said hub unit for drivingly connecting said rings to said hub unit.

FREDERICK CRUTCHLEY.

REFERENCES CITED

The following references are of record in the file of this patent:

UNITED STATES PATENTS

| Number | Name | Date |
|---|---|---|
| Re. 22,635 | Thelander | Apr. 17, 1945 |
| 2,140,818 | Stein | Dec. 20, 1938 |
| 2,222,507 | Hunt | Nov. 19, 1940 |
| 2,277,558 | Nutt | Mar. 24, 1942 |

FOREIGN PATENTS

| Number | Country | Date |
|---|---|---|
| 570,764 | Great Britain | July 20, 1945 |
| 590,446 | Great Britain | July 17, 1947 |